United States Patent
Muthuswamy et al.

(10) Patent No.: US 12,407,700 B2
(45) Date of Patent: Sep. 2, 2025

(54) SYSTEM AND METHOD TO PERFORM GOVERNANCE ON SUSPICIOUS ACTIVITY DETECTION PIPELINE IN RISK NETWORKS

(71) Applicant: International Business Machines Corporation, Armonk, NY (US)

(72) Inventors: Srinivasan S. Muthuswamy, Bangalore (IN); Subhendu Das, Chapel Hill, NC (US); Mukesh Kumar, Bangalore (IN); Willie Robert Patten, Jr., Hurdle Mills, NC (US)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 17/538,420

(22) Filed: Nov. 30, 2021

(65) Prior Publication Data

US 2023/0171274 A1   Jun. 1, 2023

(51) Int. Cl.
*H04L 9/40* (2022.01)
*G06Q 20/40* (2012.01)
*H04L 41/0866* (2022.01)

(52) U.S. Cl.
CPC ...... *H04L 63/1425* (2013.01); *H04L 41/0866* (2013.01); *G06Q 20/401* (2013.01)

(58) Field of Classification Search
CPC ............ H04L 63/1425; H04L 41/0866; G06Q 20/401; G06Q 20/4016; G06Q 10/0635; G06Q 40/02
See application file for complete search history.

(56) References Cited

U.S. PATENT DOCUMENTS

| | | |
|---|---|---|
| 7,499,897 B2 | 3/2009 | Pinto et al. |
| 8,713,436 B2 | 4/2014 | Cheng et al. |
| 9,535,809 B2 | 1/2017 | Soorianarayanan et al. |

(Continued)

FOREIGN PATENT DOCUMENTS

| | | |
|---|---|---|
| CN | 108494590 A | 9/2018 |
| CN | 105653419 B | 10/2018 |

(Continued)

OTHER PUBLICATIONS

Cala, J., et al., "Selective and Recurring Re-computation of Big Data Analytics Tasks: Insights from a Genomics Case Study", Big Data Research, Jun. 2018, 19 pages.

(Continued)

*Primary Examiner* — Richard G Keehn
(74) *Attorney, Agent, or Firm* — Scully, Scott, Murphy & Presser, P.C.

(57) ABSTRACT

A computer-implemented system, platform, computer program product, tool, and/or method for capturing data and metadata for providing traceability of data analytic pipeline runs that includes: triggering a first pipeline run; obtaining a pipeline configuration for the first pipeline run, including one or more tasks; capturing and storing the pipeline configuration and starting inputs for the first pipeline run; executing the first pipeline run; capturing, before each task in the first pipeline run is executed, input data and input metadata for each task; capturing, after each task in the first pipeline run is executed, output data and output metadata for each task; and capturing the alerts for the first pipeline run.

19 Claims, 10 Drawing Sheets

(56) References Cited

U.S. PATENT DOCUMENTS

| | | | |
|---|---|---|---|
| 9,633,115 | B2 | 4/2017 | Byrne et al. |
| 9,767,145 | B2 | 9/2017 | Prophete et al. |
| 10,268,573 | B2 | 4/2019 | Karle et al. |
| 11,036,483 | B2* | 6/2021 | Veljanoski ............... G06F 8/71 |
| 11,216,303 | B1* | 1/2022 | Willson ............... G06F 9/4881 |
| 11,403,136 | B1* | 8/2022 | Willson ............... G06F 9/541 |
| 12,206,708 | B2* | 1/2025 | Crabtree ............. G06F 16/2477 |
| 2013/0018662 | A1 | 1/2013 | Dubbels et al. |
| 2014/0089193 | A1 | 3/2014 | Boding et al. |
| 2014/0354669 | A1* | 12/2014 | Galazin ................ G06T 15/005 |
| | | | 345/582 |
| 2016/0180573 | A1 | 6/2016 | Jain et al. |
| 2016/0253340 | A1 | 9/2016 | Barth et al. |
| 2018/0260239 | A1* | 9/2018 | Vadapandeshwara ....................... |
| | | | G06F 9/5005 |
| 2020/0257614 | A1 | 8/2020 | Davis et al. |
| 2022/0067738 | A1* | 3/2022 | Fang ................... G06Q 20/389 |
| 2023/0091775 | A1* | 3/2023 | Manzano ............. G06F 16/212 |
| | | | 707/756 |

FOREIGN PATENT DOCUMENTS

| | | | |
|---|---|---|---|
| CN | 116205717 A | 6/2023 | |
| JP | 2023-081325 A | 6/2023 | |
| WO | WO-2023096887 A1 * | 6/2023 | ........... G06F 9/5038 |

OTHER PUBLICATIONS

Anonymous, "Patent Mining—Method to Replay Fraud Analytics from Historical Records in a Big Data Environment," IPCOM000262114D, IP.com, May 1, 2020, 3 pages.

De, S., "Newt: An Architecture for Lineage-based Replay and Debugging in DISC Systems", Thesis, UC San Diego, 2012, 89 pages.

Rupprecht, L., et al., "Improving Reproducibility of Data Science Pipelines through Transparent Provenance Capture", Proceedings of the VLDB Endowment, 2020, 15 pages, vol. 13, No. 12.

"MLOps: Continuous delivery and automation pipelines in machine learning", published by Google, last update Jan. 7, 2020 UTC, 18 pages.

* cited by examiner

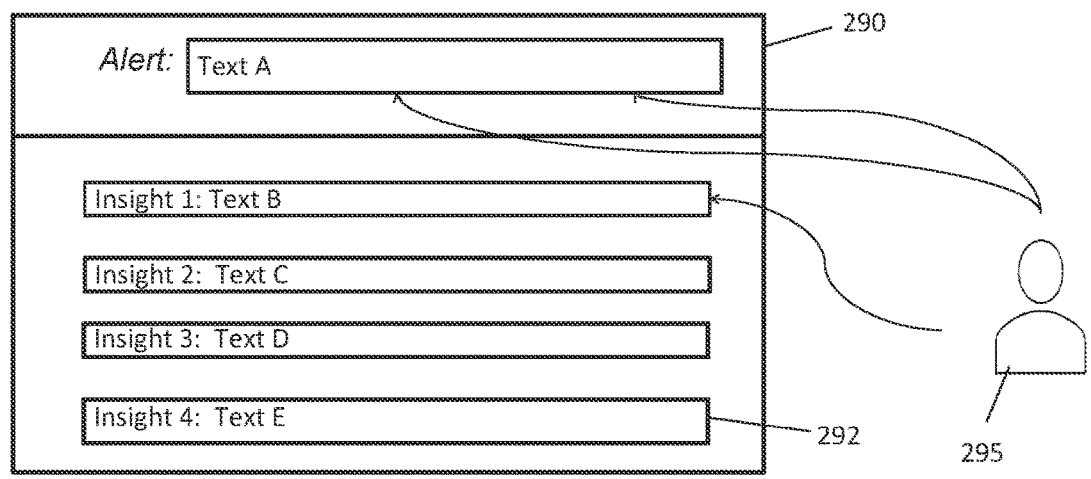
FIG. 5
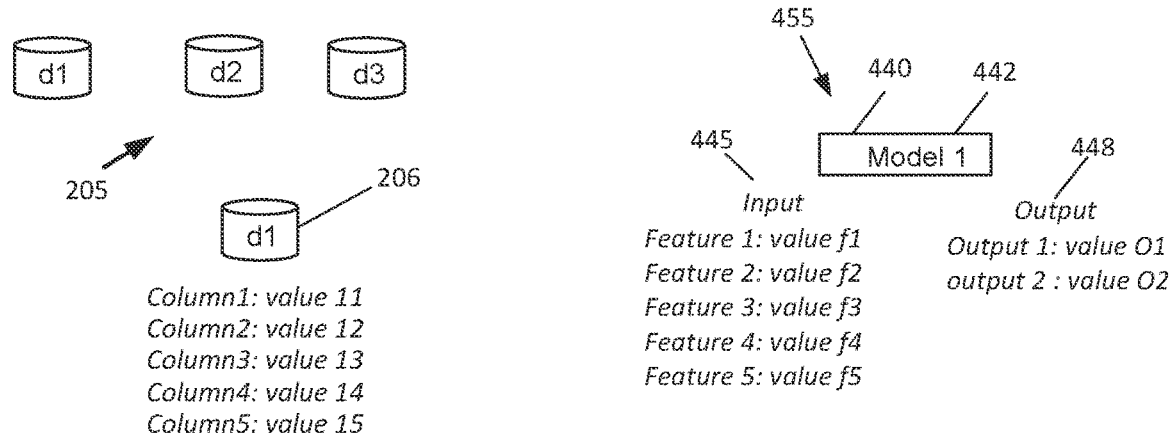
FIG. 7                    FIG. 8

Table 3

| History runs | Score |
|---|---|
| 1-Jun | 0.5 |
| 2-Jun | 0.6 |
| 3-Jun | 0.75 |

Historical scores for Claim 2

1. Facts/derived/connects facts about entity
2. Config
3. Code
4. Transformations
5. Models
6. Rules

SYSTEM AND METHOD TO PERFORM GOVERNANCE ON SUSPICIOUS ACTIVITY DETECTION PIPELINE IN RISK NETWORKS

FIELD

The present application relates generally to information handling and/or data analytics, and more particularly to methods, computer systems, platforms, tools, and computer program products for detecting suspicious activities and/or transactions and for performing governance of a data analytics pipeline for detecting suspicious activity including tracing back results (e.g., alerts, insights) to the input data and showing how the input data was processed.

BACKGROUND

There is a regulatory need for monitoring financial transactions and activity of account holders at financial institutions to detect any suspicious activities and/or behavior such as, for example, fraudulent financial transactions. There is also a regulatory need for monitoring insurance claim activity to detect any suspicious activities and/or behavior such as, for example, fraudulent insurance claims. Detecting activity indicative of fraudulent or criminal activity is increasingly difficult due to the large amount of data and information, such as, for example, numerous financial transactions, numerous parties/entities, and/or numerous insurance claims.

There have been developed electronic systems and data analytical processes to detect suspicious activity indicative of financial and/or insurance fraud, criminal behavior, and other suspicious activity. These advanced information and data analytics systems, platforms, and/or methods discover, define, and/or detect for example data patterns within relationship networks, for example, a large-scale network of financial transactions, insurance claims, and the like involving numerous parties and transactions, that are indicative of suspicious activity and behavior that may be indicative of fraudulent and/or criminal behavior.

In the financial and/or insurance scenario, the electronic systems and data analytical platforms and/or processes create alerts that are often reviewed by analysts and managers, each having different roles in the analysis and vetting process. In typical scenarios, new data is imported into the electronic data analytics system, for example a day's financial transactions and/or insurance claims, and electronic analytical processes are run for example on all the data, old and new data, and the electronic data analytics system generates alerts, if appropriate. The alerts can take many forms and generally will flag a person or incident that is suspicious and might require further review and analysis. The alert often goes to a case manager who reviews the alert, and if the alert is credible, then it might be investigated by an internal team, and if the internal team finds the alert credible then a suspicious activity report (SAR) or suspicious claim report might be prepared. In the financial crime investigation, the suspicious activity report (SAR) or suspicious claim report might even be sent to governmental authorities or other analysts for review.

In financial crime investigation, one important aspect is to be able to explain in a transparent way how a given data of a person or account translated into insights, an alert, a report, or suspicious activity report (SAR). It would be advantageous to be able to trace back the result (e.g., the alert, insight, report) to the input data and show how the data is processed by the system, the features, model insights, and finally arrive at the result (e.g., the insight, alert, and/or report). It would be advantageous to be able to trace back the result to the source of the data, and to explain unusual individual patterns, irregularities, or inconsistencies as well as unusual global patterns, irregularities, and inconsistencies. It would be further advantageous to include visualizations to explain the differences causing unusual patterns, irregularities, or inconsistencies.

SUMMARY

The summary of the disclosure is given to aid understanding of suspicious activity analytics pipelines including an end-to-end governance of the suspicious activity analytics pipeline that can, for example, trace back the result to provide transparency as to how a result was arrived at, and not with an intent to limit, the disclosure. The present disclosure is directed to a person of ordinary skill in the art. It should be understood that various aspects and features of the disclosure may advantageously be used separately in some circumstances or instances, or in combination with other aspects, embodiments, and/or features of the disclosure in other circumstances or instances. Accordingly, variations and modifications may be made to the system, platform, the architectural structure, and their method of operation to achieve different effects. In this regard it will be appreciated that the disclosure presents and describes one or more inventions, and in aspects includes numerous inventions as defined by the claims.

In one or more embodiments, a system, platform, tool, computer program product, and/or method is disclosed for tracing back the result of the analytics pipeline to the source of the data that was used to prepare alert reports, and in an aspect permits visualization to explain the difference in unusual patterns. A system, platform, tool, computer program product, and/or method, preferably a computer-implemented method, is disclosed for capturing data and metadata for providing traceability of data analytic pipeline runs that includes: triggering a first pipeline run; obtaining a pipeline configuration for the first pipeline run, including one or more tasks; capturing and storing the pipeline configuration and starting inputs for the first pipeline run; executing the first pipeline run; capturing, before each task in the first pipeline run is executed, input data and input metadata for each task; capturing, after each task in the first pipeline run is executed, output data and output metadata for each task; and capturing the alerts for the first pipeline run. In an embodiment the system, platform, tool, computer program product, and/or method further includes capturing pipeline metadata, and/or in an aspect the first pipeline run is triggered manually or using a scheduler. In an approach, a pipeline manager invokes a pipeline configuration manager to obtain the first pipeline configuration, and in a further optional approach, the pipeline manager invokes a governance manager to capture and store the configuration for the first pipeline run and the starting inputs for the first pipeline run.

In one or more embodiments the system, platform, tool, computer program product, and/or method further includes the governance manager capturing and storing the input data, the input metadata, the output data, and the output metadata for each task in the first pipeline run. In an approach, the system, platform, tool, computer program product, and/or method further includes: choosing to generate traceability view of a pipeline run; generating traceability view of the pipeline run; showing all tasks in the pipeline run and their sequence; and showing the input data, the input metadata, the output data, and the output metadata for each task of the pipeline run, and in a further optional instance includes selecting one data instance; and tracing the starting input for the one data instance through each task in the pipeline run. The system, platform, tool, computer program product, and/or method can in an embodiment further include: triggering a second pipeline run; obtaining a pipeline configuration for the second pipeline run, including one or more tasks; capturing and storing the pipeline configuration and starting inputs for the second pipeline run; executing the second pipeline run; capturing, before each task in the second pipeline run is executed, input data and input metadata for each task; capturing, after each task in the second pipeline run is executed, output data and output metadata for each task; and capturing the alerts for the second pipeline run.

In an approach the system, platform, tool, computer program product, and/or method further includes: selecting any two pipeline runs for a given claim and request a comparison; retrieving the configuration of the two pipeline runs; comparing the configuration of the two pipeline runs; displaying the configuration differences between the two pipeline runs; comparing the input data, the input metadata, the output data and the output metadata for each task in the two pipeline runs; and displaying the differences in the input data, the input metadata, the output data, and the output metadata for each task in the two pipeline runs. Optionally, the system, platform, tool, computer program product, and/ or method further includes comparing the two pipeline runs against historical pipeline runs; checking whether the number of alerts in the two pipeline runs is greater than or less than the historical pipeline runs by a threshold. A report can also be generated in an aspect showing the differences between the two pipeline runs. In a further embodiment, the system, platform, tool, computer program product, and/or method includes selecting any two dates and request a comparison between pipeline runs for the two dates; retrieving the configuration of the pipeline runs for the two dates; comparing the configuration of the pipeline runs for the two dates; displaying the configuration differences between the pipeline runs for the two dates; comparing the input data, the input metadata, the output data and the output metadata for each task in the pipeline runs for the two dates; and displaying the differences in the input data, the input metadata, the output data, and the output metadata for each task in the pipeline runs for the two dates.

In an aspect a computer-implemented system to capture data for providing traceability for data analytic pipeline runs is disclosed that includes: a memory storage device storing program instructions; and a hardware processor having circuitry and logic to execute said program instructions to provide traceability of data analytic pipeline runs, the hardware processor coupled to said memory storage device and in response to executing said program instructions, is configured to perform the functions described above.

The foregoing and other objects, features, and/or advantages of the invention will be apparent from the following more particular descriptions and exemplary embodiments of the invention as illustrated in the accompanying drawings.

BRIEF DESCRIPTION OF THE DRAWINGS

The various aspects, features, and embodiments of a system, platform, tool, computer program product, and/or method to perform governance on the suspicious activity detection (SAD) pipeline used to generate one or more reports, alerts, and/or insights will be better understood when read in conjunction with the figures provided. Embodiments are provided in the figures for the purpose of illustrating aspects, features, and/or various embodiments of the systems, platforms, and methods, but the claims should not be limited to the precise arrangement, structures, features, aspects, systems, platforms, modules, functional units, programming, instructions, assemblies, subassemblies, circuitry, embodiments, methods, processes, techniques, and/or devices shown, and the arrangements, structures, features, aspects, systems, platforms, modules, functional units, programming, instructions, assemblies, subassemblies, circuitry, embodiments, methods, processes, techniques, and/or devices shown may be used singularly or in combination with other arrangements, structures, features, aspects, systems, platforms, modules, functional units, instructions, programming, assemblies, subassemblies, circuitry, embodiments, methods, techniques, processes, and/or devices. It should be noted that a numbered element is typically numbered according to the figure in which the element is introduced, is generally referred to by that number throughout succeeding figures, and like reference numbers in the figures often represent like parts of the illustrative embodiments of the invention.

FIG. 5 diagrammatically illustrates an alert and associated insights generated by running the pipeline of FIG. 4 according to an embodiment of the present disclosure;

FIG. 7 depicts an illustration of the input data for a suspicious activity detection (SAD) pipeline according to an embodiment of the present disclosure;

FIG. 8 depicts an illustration of the input and output of a representative task in a suspicious activity detection (SAD) pipeline according to an embodiment of the present disclosure;

DETAILED DESCRIPTION

The following description is made for illustrating the general principles of the invention and is not meant to limit the inventive concepts claimed herein. In the following detailed description, numerous details are set forth in order to provide an understanding of the system, platform, tool, framework, computer program product, method, and/or techniques for performing governance on a suspicious activity detection (SAD) pipeline and that in an embodiment provides traceability of results back to the source of the data, however, it will be understood by those skilled in the art that different and numerous embodiments of the system, platform, tool, framework, computer program product, and its method of operation may be practiced without those specific details, and the claims and disclosure should not be limited to the arrangements, structures, systems, assemblies, subassemblies, platforms, framework, modules, tools, functional units, circuitry, programming, instructions, embodiments, features, aspects, processes, methods, techniques, and/or details specifically described and shown herein. Furthermore, particular features, aspects, arrangements, structures, systems, assemblies, subassemblies, platforms, frameworks, modules, tools, functional units, circuitry, embodiments, programming, instructions, methods, processes, techniques, details, etc. described herein can be used in combination with other described features, aspects, arrangements, structures, systems, assemblies, subassemblies, platforms, frameworks, modules, tools, functional units, circuitry, embodiments, programming, instructions, techniques, methods, processes, details, etc. in each of the various possible combinations and permutations.

The following discussion omits or only briefly describes conventional features of information processing systems and data networks, including electronic data analytics programs or electronic risk assessment tools and/or systems configured and adapted to detect suspicious activity and generate alerts in connection with, for example, financial and/or insurance claim transactions, which should be apparent to those skilled in the art. It is assumed that those skilled in the art are familiar with data processing and data analytics including large scale data processing/analytics (also referred to as information/data processing systems) and their operation, and the application of data analytics, including data analytics systems, tools, platforms, machine-learning, and/ or processes to detect suspicious activity that may be indicative of fraud and/or other criminal behavior.

Figure 1:
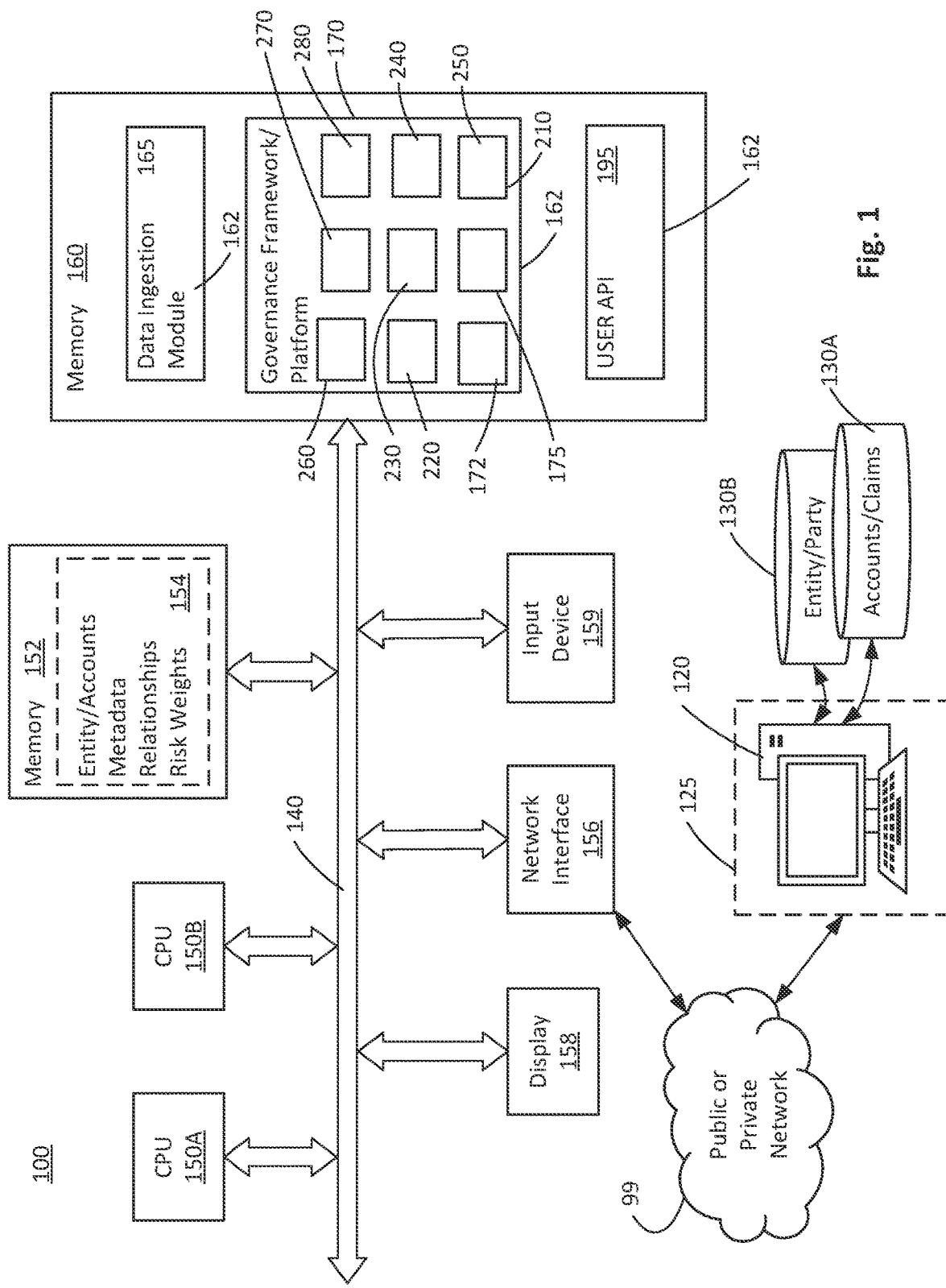
FIG. 1 schematically shows an exemplary computer system/computing device which is applicable to implement one or more embodiments of the suspicious activity and risk assessment tool of the present disclosure including the governance operations of the risk assessment tool of the present disclosure.

FIG. 1 illustrates an embodiment of an electronic risk assessment tool 100 implementing methods to detect suspicious activity in the domain of financial services, insurance claims processing, and related industries, e.g., insurance claim fraud and/or financial fraud detection. In embodiments, such a system tool 100 may be employed by or for a financial institution (e.g., a bank) or an insurance company who may issue, or a regulatory authority who may receive, an alert concerning a particular party, organization, and/or transaction(s). The alert may be issued by a financial institution against an entity or party who has been found to participate in suspicious activity, e.g., a bank has found suspicious activity undertaken by a given party, and reports this to the concerned authorities. In insurance fraud, an alert may be issued against an entity and/or insurance claim, and a "suspicious" entity may be a doctor, auto body shop, a claimant, or any party who may be placed on a "watch" list.

Figure 16:
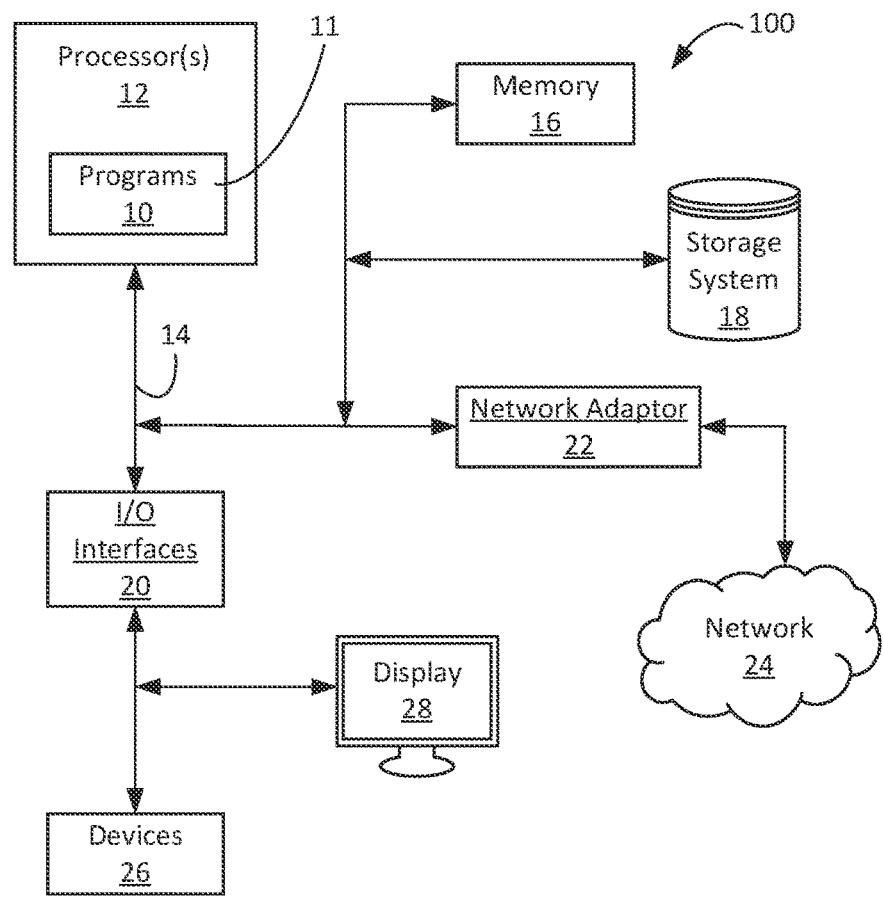
FIG. 16 illustrates yet another exemplary system in accordance with the present disclosure.

In the context of detecting suspicious financial activity, e.g., fraudulent transactions as a result of stolen credit card credentials and/or insurance claim fraud, risk assessment tool 100 according to an embodiment can be a computer system, a server, computing device, personal computer, laptop, tablet, smart device, mobile device, smart phone, or any other similar computing device configured to run risk assessment software applications and models, an embodiment of which is described in more detail in FIG. 16.

Risk assessment tool 100, also referred to as a system or platform, includes one or more hardware processors 150A, 150B (also referred to as central processing units (CPUs), a memory 160, e.g., for storing an operating system, application program interfaces (APIs) and program instructions, a network interface 156, a display device 158, an input device 159, and can include any other features common to a computing device. In some aspects, risk assessment tool or system 100 may, for example, be any computing device that is configured to communicate with one or more networks 125 or web-sites 125 including a cloud-based server 120 over a public or private communications network 99. For instance, network or web-site 125 may include a financial institution that records/stores information, e.g., financial transactions occurring between numerous parties (entities). Network or web-site 125 can also include an insurance organization or syndicate that records/stores information, e.g., multiple insurance claims occurring between and involving multiple parties and multiple transactions. Such electronic transactions and/or claims can be stored in a database 130A with associated financial account and/or claims information while entity and party information can be stored in related database 130B. Further, as shown as part of system 100, there can be a local memory and/or an attached memory storage device 152, or a remote memory storage device, e.g., a database, accessible via a remote network connection for input to the system 100.

In the embodiment depicted in FIG. 1, processors 150A, 150B may include, for example, a microcontroller, Field Programmable Gate Array (FPGA), or any other processor that is configured to perform various operations. Communication channels 140, e.g., wired connections such as data bus lines, address bus lines, Input/Output (I/O) data lines, video bus, expansion busses, etc., are shown for routing signals between the various components of system 100. Processors 150A, 150B are configured to execute instructions as described below. These instructions may be stored, for example, as programmed modules in an associated memory storage device 160.

Memory 160 may include, for example, non-transitory computer readable media in the form of volatile memory, such as random-access memory (RAM) and/or cache memory or others. Memory 160 may include, for example, other removable/non-removable, volatile/non-volatile storage media. By way of non-limiting examples only, memory 160 may include a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 156 is configured to transmit and receive data or information to and from server 120, e.g., via wired or wireless connections. For example, network interface 156 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 100 to transmit information to or receive information from the server 120.

Display 158 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 158 may include a liquid crystal display (LCD), an e-paper/e-ink display, an organic LED (OLED) display, or other similar display technologies. Display 158 optionally may be touch-sensitive and may also function as an input device. Input device 159 may include, for example, a keyboard, a mouse, a touch-sensitive display, a keypad, a microphone, or other similar input devices or any other input devices that may be used alone or together to provide a user with the capability to interact with the computing device 100.

With respect to configuring the computer system as a risk assessment tool 100 for detecting suspicious activity, e.g., financial fraud, and creating alerts, the local or remote memory 150 may be configured for storing information and associated meta-data 154. Such captured and stored data can include but is not limited to: parties, accounts, transactions, claims, relationships, and associated metadata obtained from transactions, claims, and/or data stored in the electronic databases 130A, 130B. Alternately or in addition, the entity data, entity relationships, transactional data and meta-data 154 can be stored in a separate local memory storage device attached to the computer system 100.

Memory 160 of system 100 in one or more embodiments stores tools, and/or platforms that include or constitute one or more modules 162 having programmed instructions adapted to perform risk assessment as it relates to detecting suspicious activity, e.g., financial fraud, money laundering, insurance fraud, and creating alerts.

In an embodiment, one of the programmed processing and/or analytics modules 162 stored at the associated memory 160 includes a data ingestion module 165 that provides instructions and logic for operating circuitry to access/read large amounts of data (e.g., parties, accounts, transactions, claims data) for use by other modules that process and analyze the data to form and output alerts. In one or more embodiments, the input data for data ingestion module 165 comprises parties, accounts, transactions, claims, etc. For example, where a financial institution, such as for example a bank, desires to determine if there is a money laundering scheme or other fraud, for example as a result of governmental oversight, or regulations, such as for example anti-money laundering (AML) laws, the input data can comprise: the transactions occurring with or being processed by the financial institution; the parties to any financial transaction with or through the financial institution; and account information (the customers) of the financial institution. In the case of an insurance organization and the like, the input data can comprise: the parties doing business with the insurance organization; the claims made with the insurance organization; policy information (the customers) of the insurance organization, the identity of any agencies or brokers that were involved in underwriting the policy, and any parties involved in treating the claim, e.g., auto body shop fixing the motor vehicle, physician treating patient, etc. The examples above are not limiting and there can be other situations where the system/tool/platform will have application, and additional or other input data can be provided.

In an embodiment, memory 160 includes an Analytics and Governance Framework and/or Platform 170 that provides instructions and logic for operating circuitry to process and analyze data, typically large amounts of data, to form and output alerts. Analytics and Governance Platform 170 (also referred to as Governance Platform 170, Platform 170, Framework 170, Governance Framework 170, System 170, Tool 170, or Module 170) preferably contains one or more models to determine a fraud risk probability based on the variables, and/or data. Based on the data and the models, Governance Platform 170 produces insights, alerts and/or reports; an analyst can review the insights and/or alert; and the analyst can provide feedback as to a potential risk level of a party, transaction, and/or claim.

Governance Platform 170 can contain and call up one or more models to process and analyze the data and provide associated alerts for review by an analyst. Governance Platform/Module 170 can include and invoke, for example, supervised (or unsupervised) machine learning (ML) techniques through, for example, ML Model Module 172, for detecting suspicious activity indicative of criminal activity, e.g., fraud, as known in the art, e.g., supervised learning using a regression model to predict a value of input data (classification) and unsupervised learning (clustering) techniques. The Governance Platform 170, including for example the ML Model Module 172, in an embodiment can include a Risk-by-Association analyzer that provides instructions and logic for operating circuitry which can run a probabilistic risk model to generate risk-by-association analysis scores. In an embodiment, another optional processing module 162 stored in the associated computer memory 160, and in an aspect as part of the Governance Platform 170, is a pattern determination module or model that employs logic and instructions for detecting any data patterns indicative of suspicious activity or behavior in the transaction network that is indicative of criminal and/or fraudulent activity. Based on features and metadata relating to a party, transactions, claim data, environmental data, industry data, location data, other data, and changes to the data that are captured, techniques employing Hidden Markov Models or Artificial Neural Networks may alternatively or additionally be employed to compute a risk associated with a particular party, a transaction, claim, and/or changes in data states. Machine learning (ML) Model Module 172 is shown as included within the Governance Platform 170 but can be a separate module/model from the Governance Platform 170.

In an embodiment, Governance Platform 170 includes an optional graph and build module/model 175, e.g., in memory 160, and provides instructions and logic for operating circuitry to form/build graphs, e.g., relationship networks, for use in producing alerts and accessing risk, and/or read data from graphs. Graph build module 175 is shown as included within the Governance Platform 170 but can be a separate module/model from the Governance Platform 170. Other modules or models can include further rules models. Further details and explanation of the Governance Platform 170 is discussed below, and the Governance Platform 170 is not limited to the modules or models discussed above and any number of models/modules can be used in the Governance Platform 170.

In an aspect, the ingestion module 165 would load the received input data, the Governance Platform 170 determines from the input data, which may, for example, be party data, account data, transaction data, claim data, industry data, geographical data, and other data, including metadata, various insights and whether to issue an alert. In most instances, large amounts of data are input and processed by the data ingestion module 165. Memory 160 optionally includes a supervisory program having instructions for configuring the system 100 to call or invoke one or more, and in an embodiment all, of the program modules and invoke the suspicious activity detection operations of the risk assessment tool 100. In an embodiment, the supervisory program calls methods and provides application program interfaces (APIs) for running Governance Platform 170 for generating reports and/or alerts using the data ingested by the data ingestion module 165.

At least one application program interface (API) 195 is invoked in an embodiment to receive input data from a user, e.g., a domain expert trained in finance/financial matters particularly in the context of detecting criminal and/or fraudulent activity. Via user API 195, the analyst receives reports and/or alerts. The analyst reviews the alert, including the insights, and in an embodiment can provide feedback information to either escalate or close the investigation of a particular party, transaction, etc. depending on the risk. Further investigation can lead to the issuance of a suspicious activity report and/or suspicious claim report.

There is a need to perform governance of the suspicious activity detection (SAD) pipeline including a need to explain in a transparent way how a given data of a person, account, or claim results in an alert or suspicious activity report (SAR). More specifically, there is a need to trace back the result (alert) to the input data and show how the data is processed in the system, including identifying the features, model insights, and how an alert is generated. There is a further need to explain unusual individual patterns. For example, where Claim A is scored for three (3) different days and the first day the score is 50 and the third day the score is 75 it would be advantageous to explain the unusual changes and variances (which could be because, for example, an improved or different model, new facts about the entity, and/or improved feature selection). There is also a need to explain unusual global patterns. For example, where for a period of ten (10) days the system generated an average of 100 alerts and for the next two days the system generates an average of 250 alerts, there is a need to explain this unusual change in behavior for the SAD pipeline.

In one or more embodiments the Governance Platform 170 performs governance of the suspicious activity detection (SAD) pipeline, and preferably provides end-to-end governance of the SAD pipeline. In one or more approaches, the Governance Platform 170 provides the ability to trace back a result of a SAD pipeline to the input data and can show how the data is processed in the system, including the features, model insights, and the result. In one or more aspects, the changes to the SAD pipeline are tracked, including for example changes to the data, data tasks, configuration for the data tasks, model tasks and model configuration tasks, model performance, and/or rules. In one or more further aspects, the SAD pipeline runs are tracked, including for example the input/output data, alerts, and statistics. In a preferred embodiment, the result is tracked back to the source of the data, and in an aspect, visualization is provided to explain the difference in unusual patterns.

In an embodiment, the Governance Platform 170 captures and stores SAD pipeline updates as configuration updates, captures and stores SAD pipeline run events to capture the run configuration, generates the traceability upon request from the SAD pipeline and/or pipeline run configuration, and/or generates a governance view (e.g., a traceability view, and/or comparative views).

Figure 2:
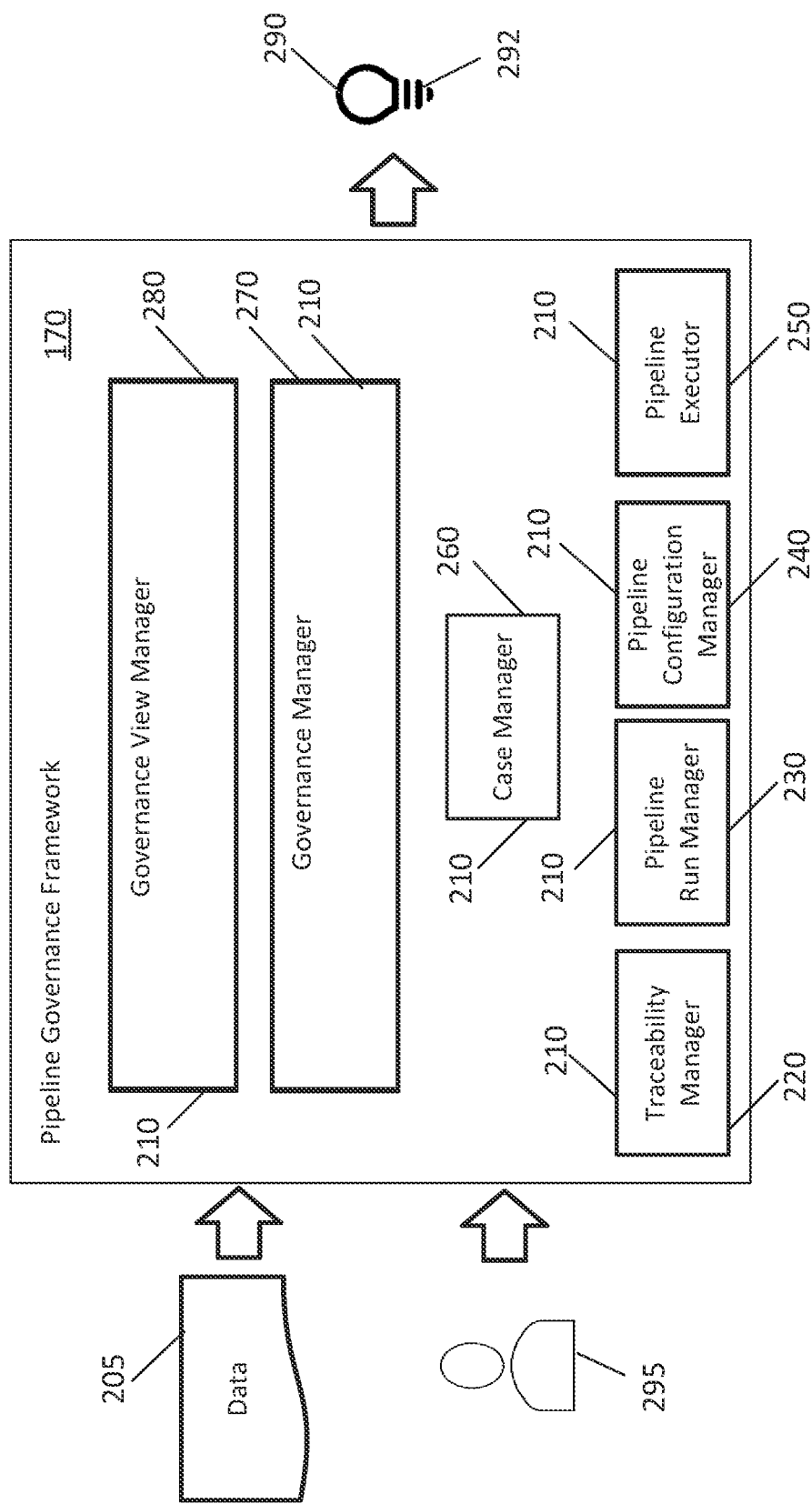
FIG. 2 schematically illustrates an overview of a block diagram of a system/module to run electronic data analytics programs to generate alerts to suspicious activity in accordance with an embodiment of the present disclosure and in an aspect to performance governance on a suspicious activity detection (SAD) execution pipeline, including in an aspect tracing back the result to the source of the data.

FIG. 2 discloses further details about the Governance Platform 170 that is designed and configured to generate insights and/or an alert, and as discussed in further detail can be configured to create and/or run a suspicious activity detection (SAD) pipeline that generates one or more insights and/or alerts, for example, for review at a later time by analysts. For purposes of clarity FIG. 2 discloses functional units 210 for the Governance Platform 170 while eliminating some of the details, specifics, and features of the Governance Framework 170 and the System 100 of FIG. 1. The functional units 210, and/or processing units associated with the functional units 210, contain instructions and/or logic for operating circuitry to perform the respective functions and operations of the functional units. For example, the functional units 210 contain instructions and/or logic executable by circuitry, for example in a processor, computer, server, etc., to perform one or more of the process steps performed by the functional unit.

Module 170 in the embodiment of FIG. 2 discloses functional units 210 including Traceability Manager 220, Pipeline Run Manager 230, Pipeline Configuration Manager 240, Pipeline Executor 250, and Case Manager 260. Pipeline Configuration Manager 240 creates, configures, and/or maintains a suspicious activity detection (SAD) Pipeline 400 (See FIG. 4) by, for example, determining what models/tasks to call, what data 205 to use, and how to use the data 205. The configuration can be captured in a table or as a JSON object.

Pipeline Configuration Manager 240 also maintains the revisions of the pipeline configuration such as, for example, what version, who modified/created the SAD pipeline version, and when the pipeline version was modified/created. Pipeline Configuration Manager 240 maintains details of the SAD pipeline such as input data, the pipeline flow, which filters are used and their versions, which transform functions are used and their versions, which models are used and their versions, which code modules are used and their versions. That is, for a given pipeline, the Pipeline Configuration Manager 240 maintains the change controls on each aspect of the SAD pipeline, including for example, the data, data tasks, configuration of data tasks, model tasks and model tasks configuration, model performance, and/or rules. A block diagram of the Pipeline Configuration Manager 240 is shown in connection with FIG. 3.

Pipeline Executor 250 executes the SAD pipelines, including reading the SAD pipeline configuration, its version, and executes the tasks/steps in the pipeline. Pipeline Executor 250 updates the pipeline run configuration and runs the Pipeline 300 task-by-task to generate and output insights 292 and/or alerts 290. The Pipeline Run Manager 230 maintains the run details, e.g., for each pipeline. The Pipeline Run Manager 230 manages and tracks what programs and/or models are run, including when and what is run each time a pipeline run is executed, such as, for example, when the pipeline run started and completed, and the outcome or result of the run. For each SAD pipeline run the Pipeline Run Manger 230, records tag data, version data, snapshot data, model, configuration, and results. The Pipeline Run Manager 230 knows the runtime information of any given pipeline and can be used to find which runs are impacted for a given change. A diagram of the Pipeline Run Manager 230 and the information for each pipeline run configuration is shown in connection with FIG. 3.

The Traceability Manager 220 maintains the traceability of different artifacts in the system. The Traceability Manager 220 can help to identify the pipeline runs for a given alert by tracing the alerts and what models, programs, filters, data, transform functions, insights and/or events were used to generate the alerts 290. The Traceability Manager 220 traces back the result to the source of the data, e.g., shows how the input data for a given claim, account, and/or person got transformed in preprocessing, got converted to features in feature engineering, which models ran for the input data, the results, and how the result influenced the follow-up models in the layered model approach and attributed to the decision/alert (or non-alert). The Case Manager 260 manages the various functional units 210, and in an embodiment is an application which is typically used by a user or analyst to review the alerts generated by the system. If the alert is suspicious enough, in an aspect it can be moved to an investigation queue, or if the alert is a false positive, the analyst or supervisor can close the case.

The Module 170 uses the functional units 210 to generate and run the SAD pipeline to prepare alerts 290 based upon data 205 ingested and/or received into the system 100, e.g., the Governance Platform/Module 170. For example, the Module 170 receives additional data on a periodic basis, such as, for example, every evening. The Module 170 through input from an analyst or other user, or optionally as part of a program, selects programs or models to run in order to generate alerts 290. The Module 170 that generates alerts 290 can take many forms and can have more or less functional units 210 than described in connection with FIG. 2. The Module 170, e.g., the SAD pipeline, can be run to generate alerts on a periodic basis, such as, for example at predetermined times, and/or manually by a user 295, immediately or any desired time.

Figure 3:
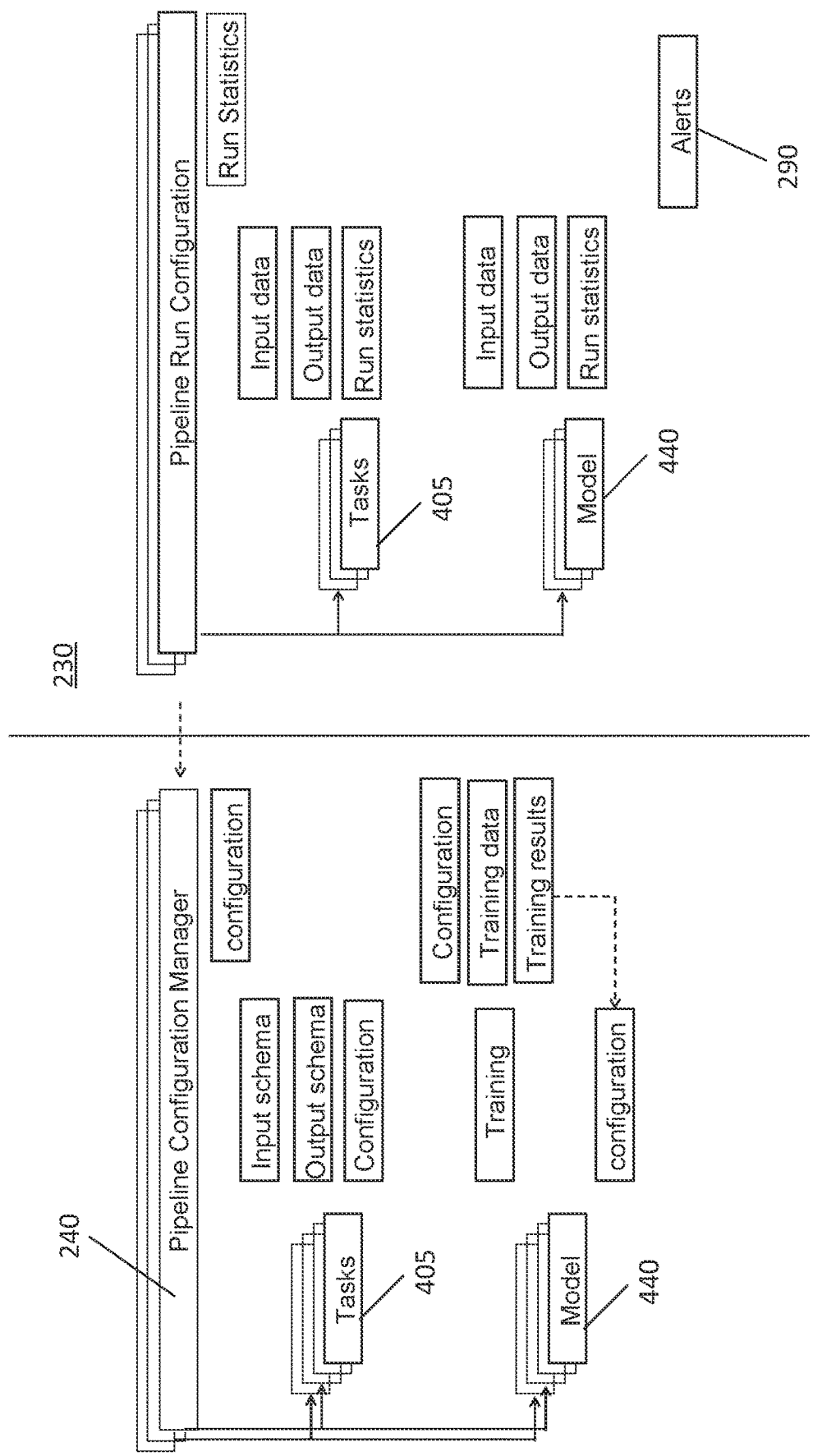
FIG. 3 illustrates a block diagram of the Pipeline Configuration Manager and Pipeline Run Manager during operation of the Risk Assessment Tool in creating a Suspicious Activity Detection (SAD) pipeline and processing input data.

FIG. 3 illustrates a block diagram of the Pipeline Run Manager 230 interacting with the Pipeline Configuration Manager 240 to generate, run, and/or execute the SAD pipeline. Upon triggering the pipeline to run, the Pipeline Run Manager 230 invokes the Pipeline Configuration Manager 240 to get the pipeline configuration and the Pipeline Run Manager 230 manages and oversees the models and programs that are run.

Figure 4:
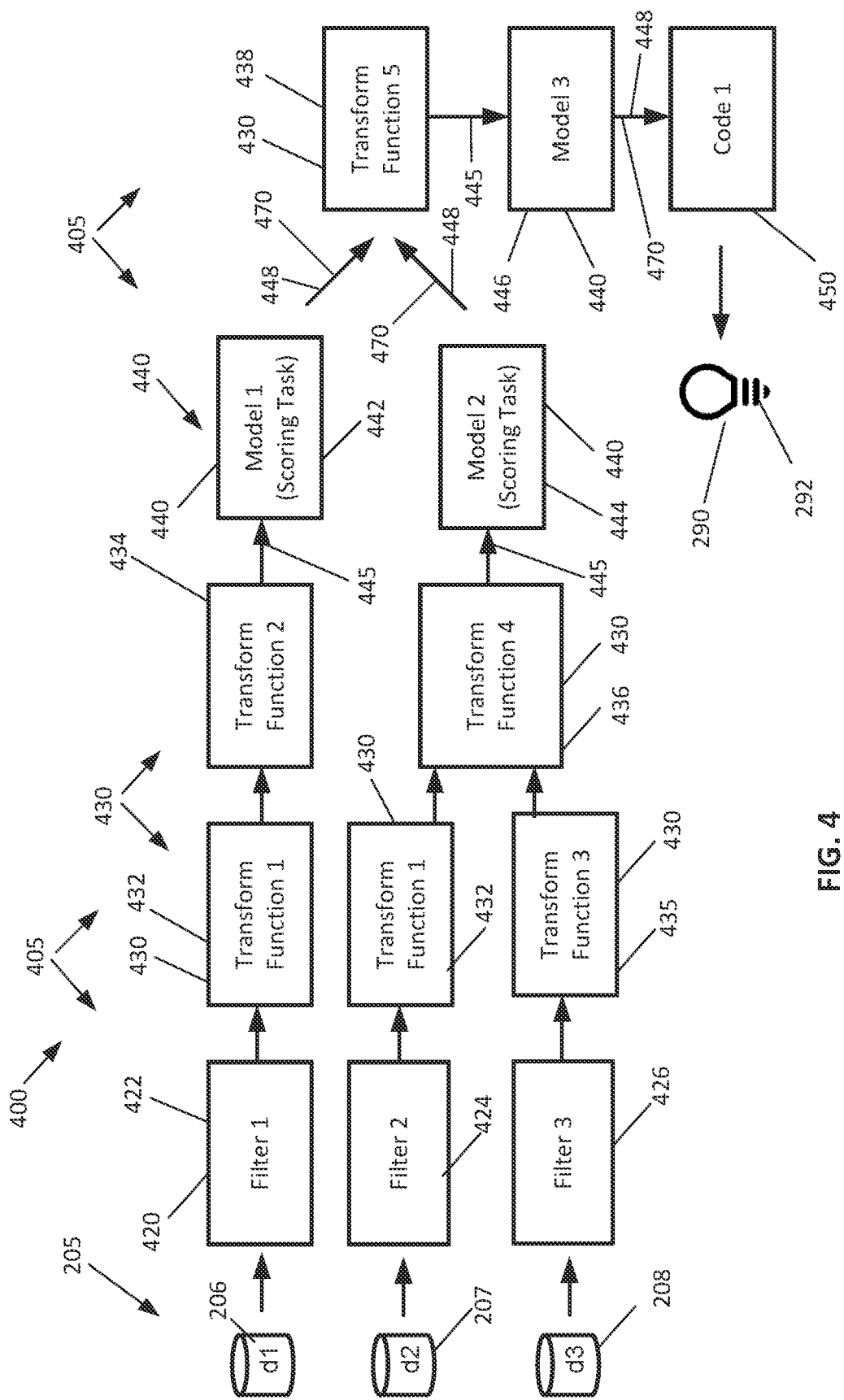
FIG. 4 illustrates a block diagram of a Suspicious Activity Detection (SAD) pipeline created, for example by the system/module of FIG. 2, for processing and analyzing data according to an embodiment of the present disclosure.

FIG. 4 illustrates a suspicious activity detection (SAD) (e.g., fraud detection) execution pipeline 400 generated and/or created by Governance Platform 170. Pipeline 400 in an embodiment includes receiving and/or ingesting data 205, illustrated as data subset 206 (d1), data subset 207 (d2), and data subset 208 (d3) in FIG. 4, where for example d1 data subset 206 represents parties, d2 data set 207 represents transactions, and d3 data set 208 represents claims. It can be appreciated that the amount of data can and likely is much larger and numerous than the data 205 illustrated in FIG. 4.

The execution pipeline 400 can include one or more tasks 405, for example one or more filters 420, one or more Transform Functions 430, one or more Models 440, and one or more Code Units 450 to process the data 205 and produce, generate, and/or output an Alert 290. The execution pipeline 400 illustrates a flow that takes data as an input and performs a number of tasks 405 to process the data to generate an output 290, which can optionally include one or more insights 292.

Execution pipeline 400 includes one or more filters 420, illustrated as Filter 1 (422), Filter 2 (424), and Filter 3 (426) in FIG. 4, that are applied to the data 205, e.g., to data d1 (206), data d2 (207), and data d3 (208). Filters 420 process the data 205 or data subsets (e.g., 206), for example, by filtering rows and columns, to obtain the desired data or data subsets in, for example, the desired format. Different filters 420 can be applied to different data as shown in FIG. 4, the same filter 420 can be applied to different data, or the different filter 420 can be applied to the same data. The detection pipeline 400 can apply one or more transform functions 430 which further process and transform the data. One example of a transformation function 430 can be an "aggregate" function, which aggregates the physical damages or injury bills against a particular claim. Another example can be a simple function which computes whether the loss date is a weekday or a weekend, and whether during business hours or after business hours. In pipeline 400, the Transform Functions 430 are Transform Function 432 (Transform Function 1), Transform Function 434 (Transform Function 2), Transform Function 435 (Transform Function 3), Transform Function 436 (Transform Function 4), and Transform Function 438 (Transform Function 5). More or less Transform Functions 430 can be used in detection Pipeline 400.

Different incident models 440 can be applied in execution pipeline 400. The one or more filters 420 and one or more Transform Functions 430 generate one or more feature sets 445 that are input and/or submitted to the one or more models 440. The one or more features or feature sets 445 includes data 205 that has been filtered, selected, and transformed into a form for use by the selected model 440. In other words, the various models 440 desire and/or require certain data in a certain format in order to run and generate an output 448. In execution pipeline 400, for example, the feature 445 (e.g., feature 1) output from Transform Function 434 is fed into Model 442 (Model 1) to generate output 448.

The models 440, also referred to as programs 440, in one or more embodiments receive input as feature set 445 and will output or generate, depending upon the amount of processing performed by the model, insights 470, alerts 290, and/or values (data) 448 that can, for example, be further processed to create insights 470 or alerts 290. In an embodiment, the output from the Module 170 and/or detection pipeline 400 is an alert 290, and the alert 290 in one or more aspects is output directly from the one or more models 440. Additionally, or alternatively, the output from the one or more models 440 can be one or more insights 470 that are used to generate one or more alerts 290. The models 440 can be, for example, a risk-by-association analyzer, a pattern determination model, a rules model, a machine learning (ml) model, etc. More or less models 440 are contemplated, and pipeline 400 is illustrated with three models 440, e.g., Model 442 (Model 1), Model 444 (Model 2) and Model 446 (Model 3).

In a further embodiment, the one or more models 440 can produce values (output 448) used to replace variables in a narrative template to create insights 470, and/or values that can be used to generate an alert 290. That is, based upon the model output 448, the detection pipeline 400 and/or Module 170 (e.g., a Transform Function 430 and/or a further model 440) can replace the variables in a narrative and provide the resulting narrative as an insight 470. For example, after applying the one or more models 440 the data output 448 from the model 440 may undergo further processing and manipulation by further transform function(s) 430, and by one or more models 440, to produce one or more insights 470. In one or more embodiments, because the model output 448 is technical output and users of the system typically respond to text language, e.g., sentences, that they can understand, the model output 448 can be run through a further optional Transform Function and/or a further model to construct a narrative referred to as an insight 470. In pipeline 400, for example, the output 448 from Models 442 and 444 are received by Transform Function 438 which further processes the data for insertion into a narrative where the output from Transform Function 438 is received by Model 446 as input features 445 where Model 446 inserts the values from Transform Function 438 into the narrative and Model 446 outputs one or more insights 470. As a further example, a model 442 returns two values [Cluster A, 10] where A is the cluster ID and 10 is the number of frauds in the cluster. Model 442 or another Model can place or substitute the output values 448 from model 442 into a narrative template to produce an insight 370. So, where the narrative template is defined as "Party <party_id> is in Cluster <cluster id> which contains <Number_of_fraud_parties> parties", the model 442 or another model will take the values and produce the insight, "Party A is in cluster A which contains 10 fraud parties" as an insight 470 output by model 442 or another model.

Optional Code 450 in pipeline 400 may be applied to further convert the data. For example, code 450 can be a look-up table to score the output of the case. Model 446 (Model 3) in pipeline 400 can output a numeric score or value and Code 1 450 can determine if the numerical score or value is above a threshold, and if so can generate or output an alert 290. It should be recognized that the output of the pipeline 400, or the model 440 may be in the form of "low" risk, "medium risk", or "high" risk, but it should be recognized that the output can be in other forms or formats. In one or more embodiments, input data 205 is fed into the governance platform 170, and in an embodiment into detection pipeline 400, where the input data 205 is converted into features 445 that are fed into one or more models 440 where in one or more aspects the one or more models 440 generate an output 448 as one or more insights 292, and one or more insights 292 are used to generate an alert 290.

It should be recognized that Detection Pipeline 300 can include one or more execution pipelines, or sub-branches 302 that performs one or more tasks 305. For example, Filter 322 (Filter 1), Transform Function 332 (Transform Function 1), Transform Function 334 (Transform Function 2), and Model 342 (Model 1) illustrates execution sub-pipeline 302. Each sub-pipeline 302 can have different task/functional units that undergo different tasks 305, e.g., different filters, different transform functions, and/or different models, but can also share filters, transform functions, models, and data. For example, in the insurance industry, the Governance Platform 170 can produce an auto insurance pipeline, a worker's compensation pipeline, a property-loss pipeline, and/or a medical provider pipeline, to name just a few. Each pipeline will take or use different data and perform different tasks 305 to process the data differently to identify potential suspicious activity. For example, the auto pipeline takes all auto insurance claims as input data and the worker's compensation pipeline is fed with worker's compensation claims.

The Pipeline Configuration Manager 240, based upon the user input or via the program, selects what models 440 and/or programs to call, what data or data subsets to use and how to use the data; the Pipeline Run Manager 230 manages and oversees the models and programs that are run; while the Pipeline Executor 250 runs the pipeline task-by-task to generate one or more alerts 290. The Traceability Manager 220 tracks and records how the alerts 290 were generated matching the alert 290 with, for example, the data 205, filters 420, models 440, insights 470, events, and transform functions 440 used to generate the alert 290 so that the alert 290 is traceable. For example, the Traceability Manager 220 may have one or more tables identifying the various runs executed by the Governance Platform 170, the pipelines, and the data sets used.

A user 295, e.g., analyst, typically reviews the alert 290 output by the SAD pipeline 400 to determine how to proceed, and, in particular, typically reviews the insights 292 and/or events that lead to the alert 290 being generated in the particular case in order to determine how to proceed. An embodiment of a display of an alert report 290, with the supporting insights 292, is shown in FIG. 5. The alert 290 typically relies upon one or more insights 292, and the alert or report 290 is typically presented with the insights 292 which form the basis for the alert 290. For example, insight 1 could be that the average number of transactions has changed by twenty percent (20%); insight 2 could be that the customer is part of a high-risk cluster which has a number of known frauds; insight 3 could be that the transactions are associated with a high-risk geographic zone; and insight 4 could be that there was extended inactivity in the account before the recent transactions.

The Governance Module 170 for example can have a Case Manager 260 that contains the alerts 290 and/or insights 292, and the user or analyst 295 opens the Case Manager Program 260 and reviews the alerts 290, and insights 292. The analyst 295 reviews the alert 290 and/or insights 292, and determines how to proceed, including for example to close the alert 290 if the alert 290 is believed to be a false positive, or if it is believed that there is likely some fraud and needs further investigation the case can be escalated to "investigation". In instances the analyst can decide whether to bring the alert 290 to a supervisor or manager to determine what actions to take.

In situations where the Governance Platform 170 generates one or more SAD detection pipelines 400 that generate one or more alerts, it would be advantageous to track back the result 290 to the source of the data and to be able to visualize and explain in a transparent manner how the given data on a person, account, and/or claim translates and was processed into an alert and/or generated the report 290, e.g., flagged the party, transaction, and/or claim as potentially suspicious and/or fraudulent. A system, platform, tool, computer program product, and/or method is disclosed that permits a user 295, e.g., an analyst, to review and confirm the insights 292 and alerts 290, and provides a manner to track back the results to the source of the data and in an aspect provide visualization to explain the difference causing unusual patterns.

Turning back to FIG. 2, Governance Framework 170 to track and/or trace back one or more alerts 290 to the input data and show how the data was processed in a manner to result in the alert 290, for example, to facilitate review and analysis of the results, e.g., the insights 292 and/or alerts 290, generated by the SAD pipeline 300 is disclosed, including in arrangements providing visualization to explain the differences in unusual patterns. The Governance Framework 170 includes functional units 210, such as, for example, Governance Manager 270 and Governance View Module 280, in addition to functional units 210 described earlier, e.g., Traceability Manager 220, Pipeline Run Manager 230, Pipeline Configuration Manager 240, Pipeline Executor 250, and Case Manager 260. Governance Manager 270 and Governance View Module 280 contains instructions and/or logic for operating circuitry to perform respective functions, tasks, and/or operations of the respective functional units. In an embodiment, the Governance Manager 270 captures the pipeline configuration and inputs for a given run, captures the input and other input metadata for each task, captures the output and other output metadata for each task, captures the alerts for a given pipeline run, and/or captures the pipeline metadata (e.g., the number of records processed, time to process, status, etc.). The Governance View Manager 280 in one or more embodiments facilitates the ability to compare different runs in general or for a given instance of an alert.

Other functional units 210, for example, Traceability Manager 220, Pipeline Configuration Manager 240, and Pipeline Run Manger 230, are involved in tracking and tracing back the result to the input data and how the data was processed in the system to arrive at an alert (or not), and in an aspect providing visualization to explain the difference in unusual patterns, and include in an embodiment additional instructions and/or logic for operating circuitry to perform the additional functions, tasks, and/or operations as explained herein. In an embodiment, the Governance Manager 270 can be incorporated into or be part of Case Manager 260. While Traceability Manger 220, Pipeline Run Manger 230, Pipeline Configuration Manager 240, Pipeline Executor 250, Case Manager 260, Governance Manager 270, and Governance View Manager 280 have been described as separate functional units, it can be appreciated that the functional units or modules can be combined and/or further separated into additional modules and/or functional units than shown in FIG. 2.

Figure 6:
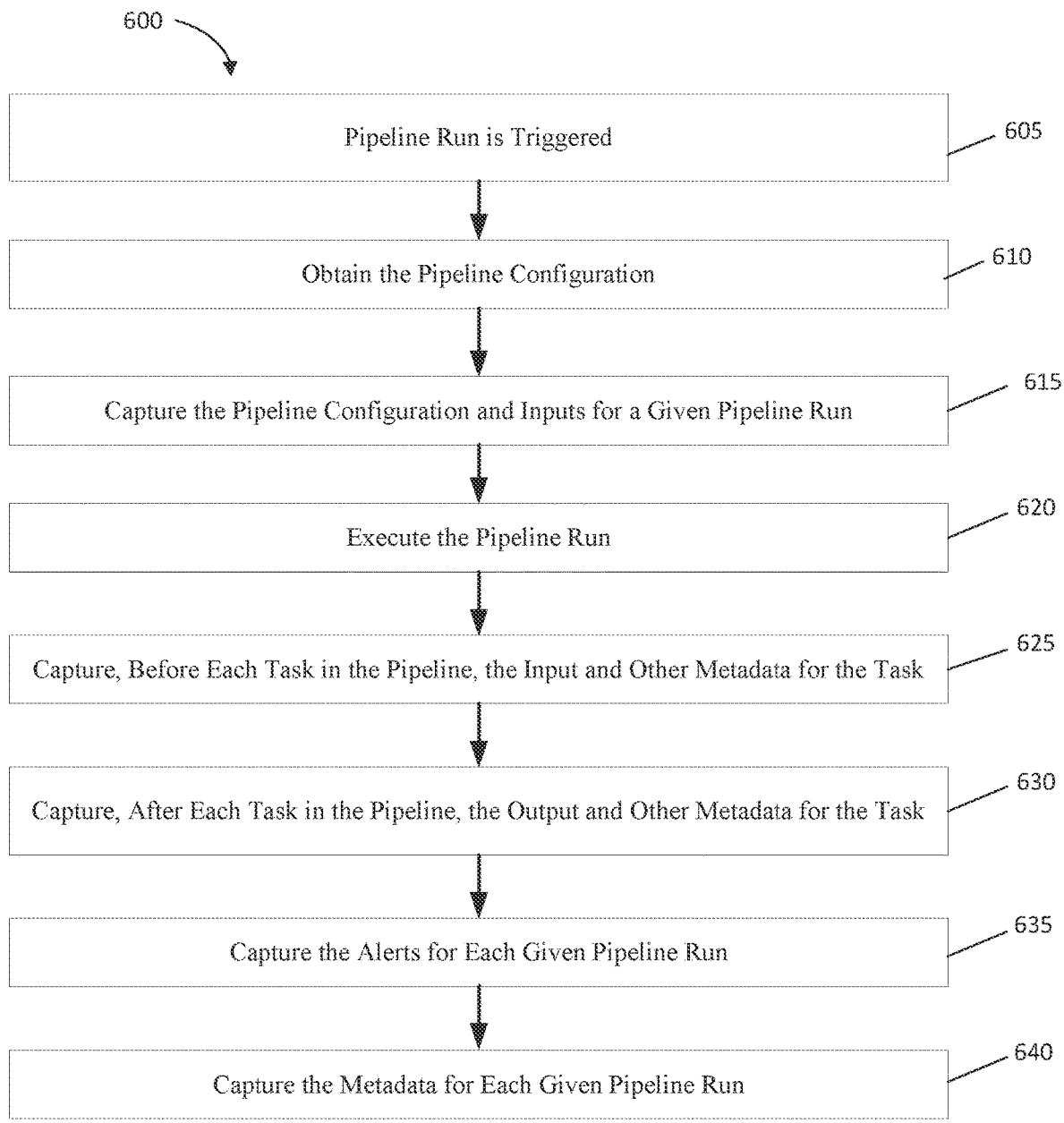
FIG. 6 illustrates a diagrammatic flowchart of a method of capturing the result of one or more runs, including the input and output of various tasks, of a suspicious activity detection (SAD) pipeline according to an embodiment of the present disclosure.

FIG. 6 is an exemplary flowchart in accordance with an embodiment illustrating and describing a method 600 of capturing data, output, and metadata in a data analytic pipeline, more specifically a suspicious activity detection (SAD) pipeline to perform traceability, including in order to trace back the alerts, insights, results, and/or patterns to the input data and show how the input data was processed in the system to arrive at the result. While the method 600 is described for the sake of convenience and not with an intent of limiting the disclosure as comprising a series and/or a number of steps, it is to be understood that the process 600 does not need to be performed as a series of steps and/or the steps do not need to be performed in the order shown and described with respect to FIG. 6, but the process 600 may be integrated and/or one or more steps may be performed together, simultaneously, or the steps may be performed in the order disclosed or in an alternate order.

As part of process 600, at 605 a pipeline run is triggered, for example a suspicious activity detection (SAD) pipeline run is triggered. In one or more embodiments a user 295, e.g., an analyst, can trigger the pipeline run. The pipeline run can be triggered manually or for example using a scheduler. At 610 the pipeline configuration is obtained. In one or more embodiments the configuration of the pipeline, e.g., the SAD pipeline, to be run is obtained.

According to an embodiment, at 610 a Pipeline Run Manager 230 invokes the Pipeline Configuration Manager 240 to obtain the configuration of the data analytics pipeline (e.g., the SAD pipeline) to be run. The pipeline configuration and inputs for a given pipeline run are captured and/or stored at 615. In an approach, the Pipeline Run Manager at 615 invokes the Governance Manager 270 to capture the pipeline configuration and the inputs for a given run.

At 620 the pipeline starts execution. In an approach, the Pipeline Run Manager 230 manages and oversees execution of the SAD pipeline. Before each task in the pipeline is performed, at 625 the input and metadata for each task is captured. In an approach, the Pipeline Run Manager invokes the Governance Manager 270 to capture the input and other metadata for each task before the task is performed. After each task in the pipeline is performed, at 630 the output and metadata for each task is captured. In an approach, the Pipeline Run Manager 230 invokes the Governance Manager 270 to capture the output and other metadata for each task after the task is performed. At 635 the alerts and/or insights for each given pipeline run are captured. In an approach for each alert and/or insight generated from the pipeline run, the Pipeline Run Manager 230 at 635 calls the Governance Manager 270 to capture the alerts and/or insights for the given pipeline run. The metadata, e.g., the number of records processed, time to process the pipeline, status, etc., is captured at 640 for each given pipeline run. In an embodiment, the Pipeline Run Manager 230 at 640 invokes the Governance Manager 270 to capture the pipeline metadata.

With the data and metadata captured in process 600 of FIG. 6, the system can generate a traceability view of the given pipeline run. With the data and metadata captured in process 600, the results (e.g., the insights 292 and/or alerts 290) can be traced back to the source (e.g., the input data 205) and it can be shown how the data is processed in the system including the input and output at each of the tasks 405.

FIG. 7 illustrates the capture of the input data 206, which in an example is captured at 615 by the Governance Manager 270. It can be appreciated that all data 205 can be captured and shown in a manner similar to FIG. 7. FIG. 8 depicts an overview schematic illustration of an original task 405 performed in SAD pipeline 400, including the captured input 445 and the captured output 448 of Model 1 442. That is, FIG. 8 illustrates the input data 445 captured at 625 by, for example, the Governance Manager 270, and illustrates the output data 448 captured at 630 by, for example, the Governance Manager 270. While FIG. 8 illustrates the capturing of input and output of Model 1 442, it can be appreciated that each of the input data and output data and metadata for tasks 405 in the SAD pipeline 400 can be captured and illustrated. That is, in one or more embodiments, the inputs, outputs, metadata, and each of the filters 420, transform functions 430, models 440, and codes 450 in SAD pipeline 400 that generated the original alert 290 are captured, and can be shown and illustrated. It can be further appreciated that the input data depicted in FIG. 7 and the tasks depicted in FIG. 8 can be captured as part of process 600. The input data 205 and tasks 405 can be captured by the Governance Manager 270 and their visualization can be facilitated by Governance View Module 280, which permits users to check the result (e.g., alert, pipeline, tasks, data, etc.) to see how system 100 arrived at its result.

Figure 9:
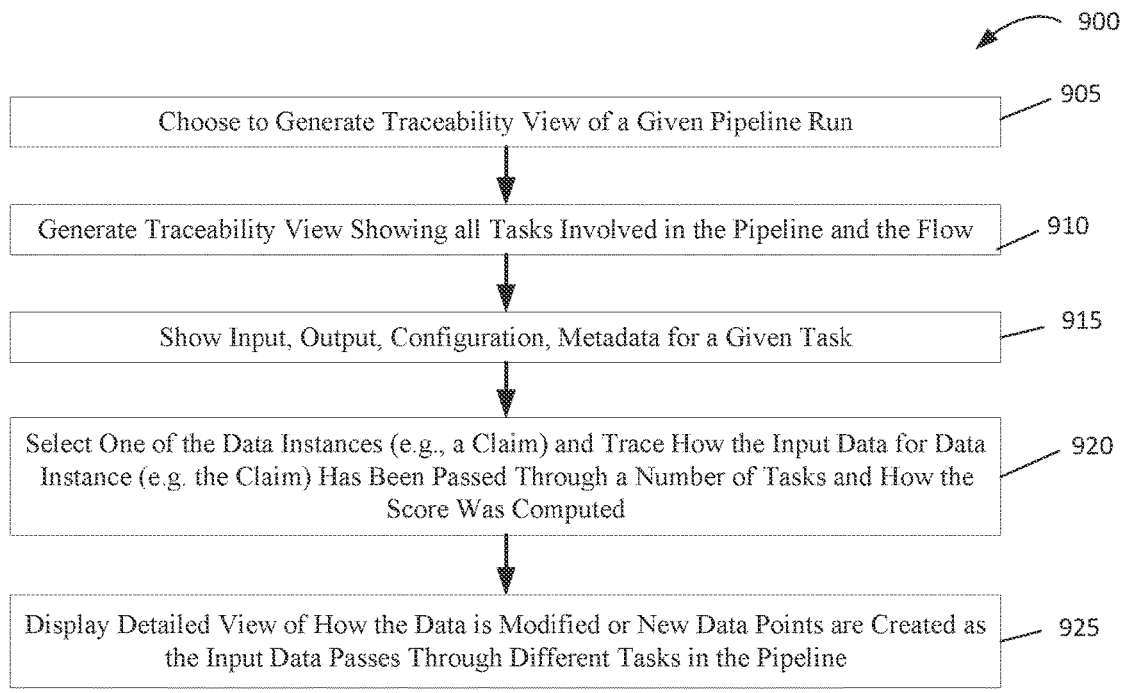
FIG. 9 illustrates a diagrammatic flowchart of a method of tracing the result of one or more runs of a suspicious activity detection (SAD) pipeline according to an embodiment of the present disclosure.

FIG. 9 is an exemplary flowchart in accordance with an embodiment illustrating and describing a method 900 of tracing back the data, output and metadata in a data analytic pipeline, more specifically a suspicious activity detection (SAD) pipeline to perform traceability, including in order to trace back the alerts, insights, results, and/or patterns to the input data and show how the input data was processed in the system to arrive at the result. While the method 900 is described for the sake of convenience and not with an intent of limiting the disclosure as comprising a series and/or a number of steps, it is to be understood that the process 900 does not need to be performed as a series of steps and/or the steps do not need to be performed in the order shown and described with respect to FIG. 9, but the process 900 may be integrated and/or one or more steps may be performed together, simultaneously, or the steps may be performed in the order disclosed or in an alternate order.

Figure 10:
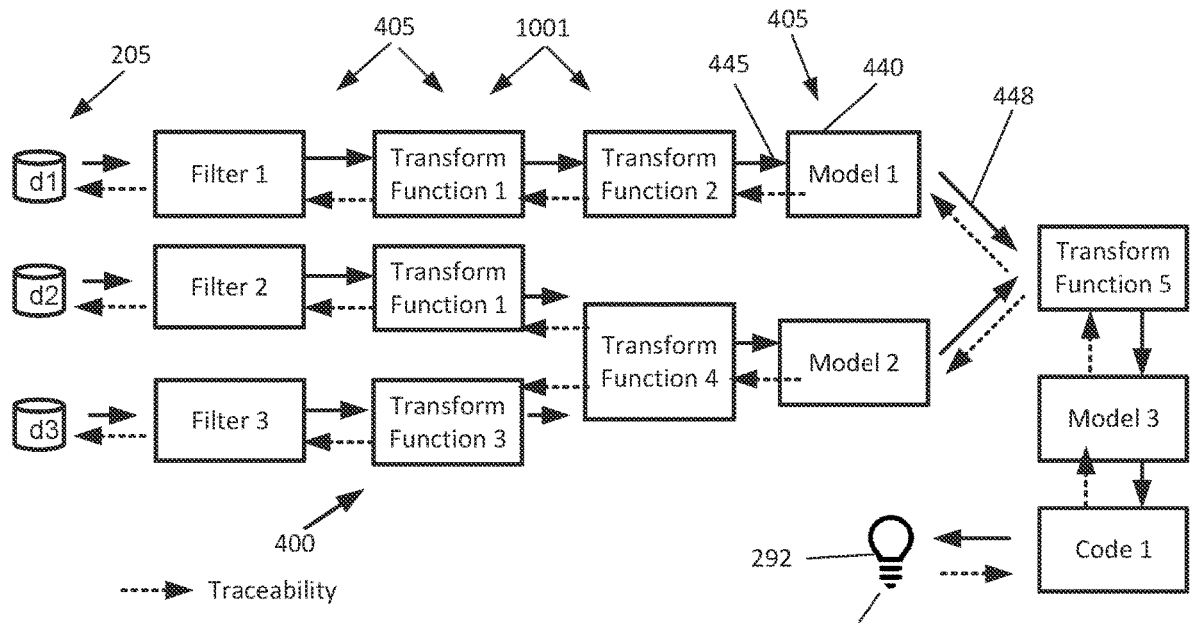
FIG. 10 illustrates a traceability block diagram for a Suspicious Activity Detection pipeline according to an embodiment of the present disclosure.

At 905 a Pipeline run is chosen to generate a traceability view. Typically, a user (e.g., an analyst) chooses to generate the traceability view of a given pipeline run, for example the pipeline run of June 3. At 910, a traceability view if generated showing all the tasks involved in the given pipeline and the flow of the given pipeline. In an embodiment, the system at 910 invokes the traceability manager 220 to generate the traceability view showing all the tasks involved in the pipeline including the flow and all the tasks performed in the pipeline. FIG. 10 illustrates the traceability view 1001 for the given pipeline (e.g., SAD pipeline 400). The input, output, configuration, and metadata is shown at 915 for a given task, including, for one or more embodiments, for each task in the pipeline. FIG. 8 illustrates an example of how the input, output, configuration and metadata can be shown for a given task.

Process 900 continues where at 920 a data instance, for example a claim, can be selected and how the input data for the data instance (e.g., the claim) has been processed is traced though each of the tasks and how the score was computed. For example, at 920 the system permits a user to select a claim and trace how the input data for the claim passes through each of the tasks and arrives at the computed score. At 925, an optional display of how the data is modified or new data points are created as the input data passes through the various different tasks in the pipeline is provided. For example, the system at 925 can provide a detailed view so that a user can visualize and better understand how the data is modified or new data points are created as the pipeline processes the data. For example, the input set of features for the claim and for the model and the model output for claim 1 can be displayed.

Figures 11, 12:
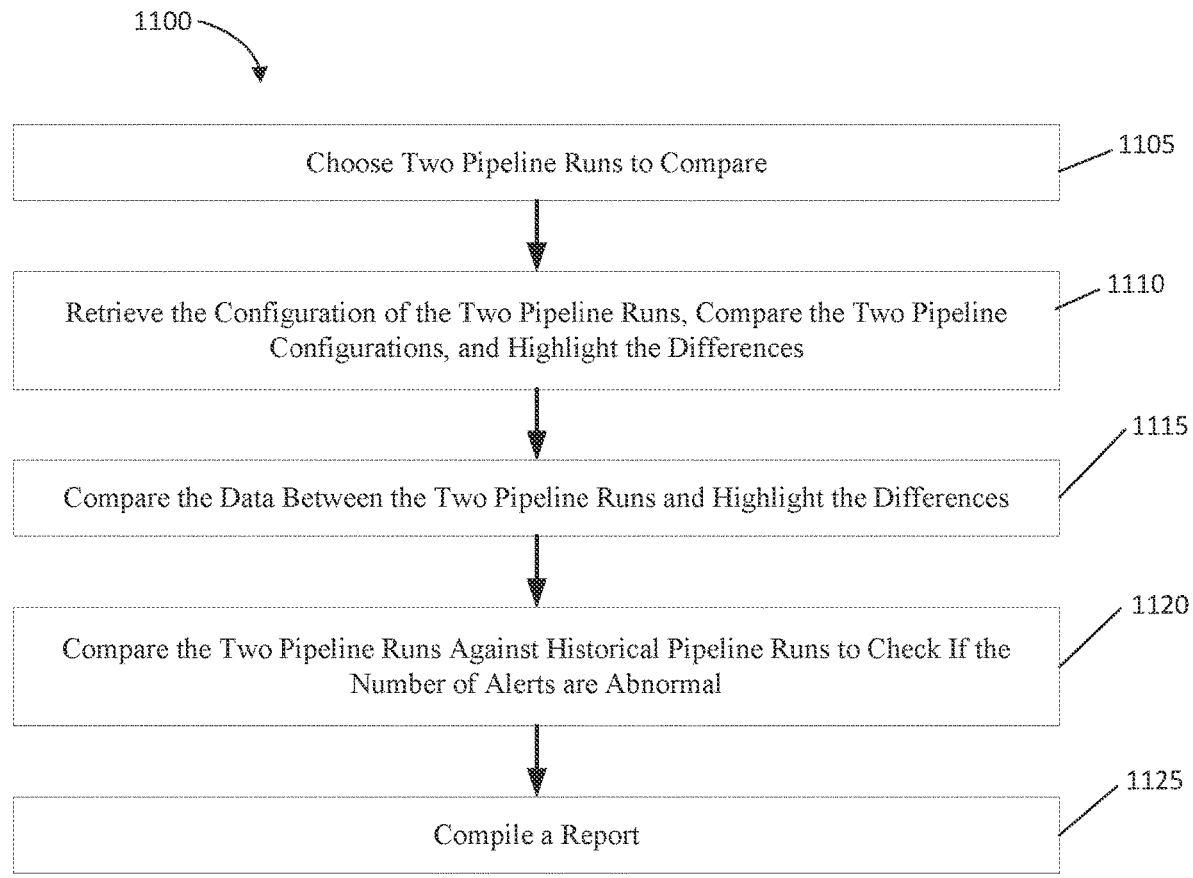
FIG. 11 illustrates a diagrammatic flowchart of a method of comparing two pipeline runs of a suspicious activity detection (SAD) pipeline according to an embodiment of the present disclosure.
FIG. 12 illustrates Table 1 listing a number of claims and their resulting scores and Table 2 illustrating the historical runs for claim 1.

FIG. 11 is an exemplary flowchart in accordance with an embodiment illustrating and describing a method 1100 of comparing two runs of a data analytic pipeline for a given claim, more specifically comparing two runs of a suspicious activity detection (SAD) pipeline for a given claim, including, for example, highlighting any differences between the two pipeline runs for the given claim. While the method 1100 is described for the sake of convenience and not with an intent of limiting the disclosure as comprising a series and/or a number of steps, it is to be understood that the process 1100 does not need to be performed as a series of steps and/or the steps do not need to be performed in the order shown and described with respect to FIG. 11, but the process 1100 may be integrated and/or one or more steps may be performed together, simultaneously, or the steps may be performed in the order disclosed or in an alternate order.

At 1105 in process 1100 two pipelines runs for a given claim are chosen and/or selected. For example, a user picks claim 1 and checks its history for historical runs and chooses between two runs to compare. This step 1105 of choosing between two pipeline runs for a given claim is shown in FIG. 12 where for example, claim 1 on June 3 having a score of 0.8 is chosen from Table 1 and claim 1 is checked for historical runs, for example runs on June 1, June 2, and June 3 as shown in Table 2. The configurations of the two pipeline runs are retrieved, the two pipeline configurations are compared, and the differences (e.g., in the two configurations) are highlighted at 1110. For example, at 1110 the different codes 450, different models 440, different transforms 430, different filters 420, different rules and/or different pipeline configurations are highlighted. In an embodiment, at 1110 a Governance View Manager, e.g., Governance View Manager 280, retrieves the configuration of the two runs and compares the two runs to highlight the differences. At 1115 the data between the two runs is compared and any differences are highlighted. For example, the presence of new input data points or any difference in the daily data distribution would be reflected, shown, and/or highlighted by the system at 1115. The Governance View Manager in an approach at 1115 compares and highlights the differences between the two runs.

At 1120 the pipeline runs for the given claim are checked against historical runs to check if the number of alerts generated for the given two pipeline runs are abnormal. The Governance View Manager at 1120 compares the pipeline runs for the given claim against historical runs to check if the number of alerts generated for the given two pipeline runs are abnormal. At 1125 a report is compiled and presented to the user, and in an aspect the Governance View Manager creates the reportTurning to FIG. 13, historical scores for claim 2 are shown in Table 3 where the difference between the run on June 2 and the run on June 3 is abnormal, so the two runs of June 2 and June 3 for claim 2 are chosen to view the traceability and check the differences, and the system displays the difference between the June 2 and June 3 run for claim 2 that are attributed to the difference in the score as illustrated on the right side in FIG. 13.

Figures 13, 14:
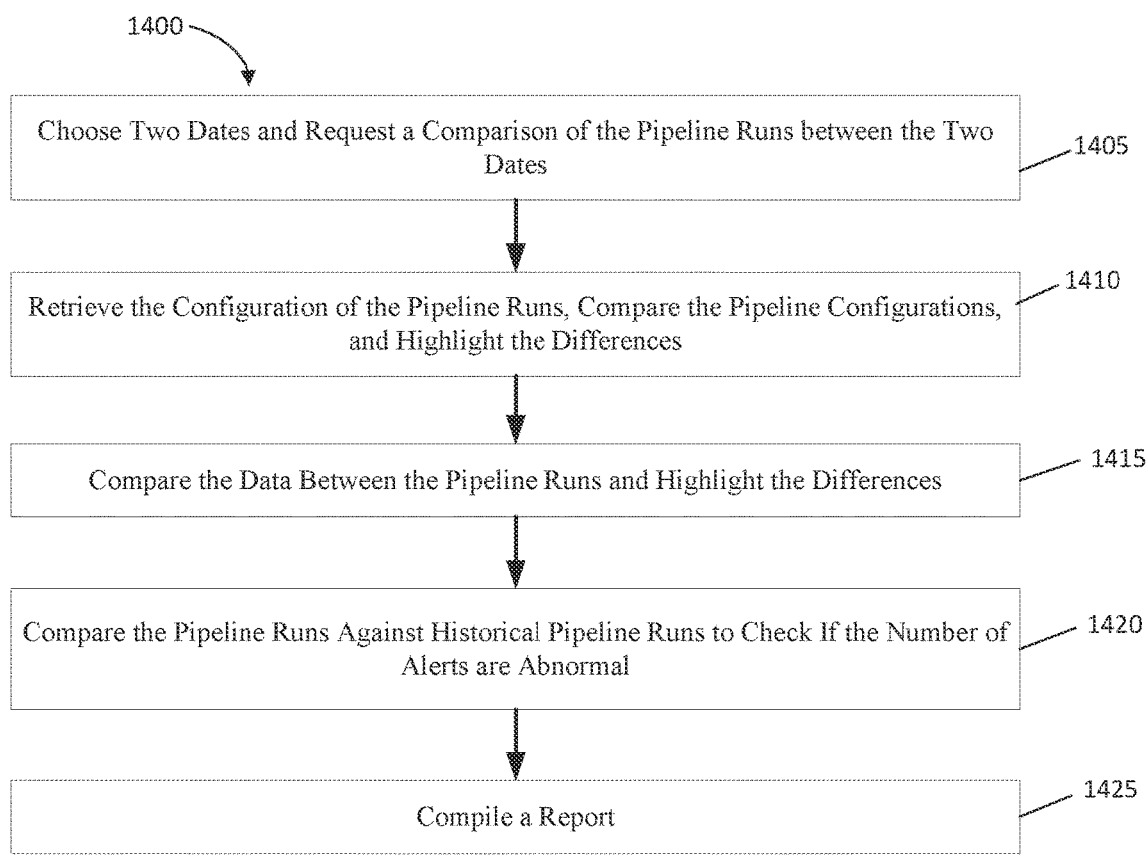
FIG. 13 illustrates in Table 2 the historical scores for claim 2 where the right side illustrates the various highlighted differences.
FIG. 14 illustrates a diagrammatic flowchart of a method of comparing two pipeline runs of a suspicious activity detection (SAD) pipeline according to an embodiment of the present disclosure.

FIG. 14 is an exemplary flowchart in accordance with an embodiment illustrating and describing a method 1400 of comparing two runs of a data analytic pipeline for different dates for a given claim, more specifically comparing two runs of a suspicious activity detection (SAD) pipeline for two different dates, including, for example, highlighting any differences between the two pipeline runs for a given claim for two different dates. While the method 1400 is described for the sake of convenience and not with an intent of limiting the disclosure as comprising a series and/or a number of steps, it is to be understood that the process 1400 does not need to be performed as a series of steps and/or the steps do not need to be performed in the order shown and described with respect to FIG. 14, but the process 1100 may be integrated and/or one or more steps may be performed together, simultaneously, or the steps may be performed in the order disclosed or in an alternate order.

At 1405 in process 1400 two dates are chosen and a request is made to compare the pipeline runs for the two dates. For example, a user picks two dates to compare the pipeline runs for those two dates. This step 1405 of choosing between two dates is shown in FIG. 13 where for example, the dates June 2 and June 3 for claim 2 are chosen (e.g., because the number of alerts seems too large). The configurations of the pipeline runs for the two dates are retrieved, the pipeline configurations are compared, and the differences (e.g., in the pipeline configurations) are highlighted at 1410. For example, at 1410 the different codes 450, different models 440, different transforms 430, different filters 420, different rules and/or different pipeline configurations are highlighted. In an embodiment, a Governance View Manager, e.g., Governance View Manager 280, at 1410 retrieves the configuration or the pipeline runs for the two dates, compares the pipeline configurations, and highlights the differences in the pipeline runs. At 1415 the data between the two runs is compared and any differences are highlighted. For example, the presence of new input data points or any difference in the daily data distribution would be reflected, shown, and/or highlighted by the system at 1415. The Governance View Manager in an approach at 1415 compares the data between the two runs and highlights any differences.

At 1420 the pipeline runs for the given claim are checked against historical runs to check if the number of alerts generated for the given two pipeline runs are abnormal. In an embodiment, the Governance View Manager at 1420 checks the pipeline runs for a given claim against historical runs to determine whether the number of alerts generated for the pipeline runs is abnormal. At 1425 a report is compiled and presented to the user that in an aspect describes the reasons for the differences in the two runs. The Governance View Manager at 1425 in an approach creates and/or generates the report, and in an aspect demonstrates and/or identifies the reasons for the differences in the pipeline runs. The system displays the difference between the June 2 and June 3 run for claim 2 that are attributable to the difference in the score as shown on the right side in FIG. 13.

Figure 15:
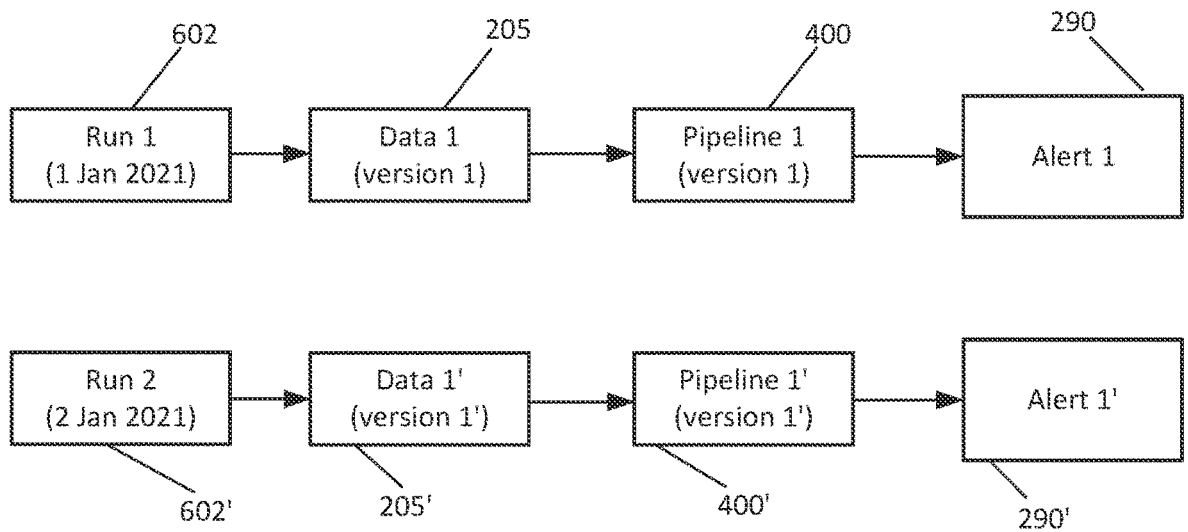
FIG. 15 depicts a diagram representing a comparison of two pipeline runs of suspicious activity detection (SAD) pipeline according to an embodiment of the present disclosure.

FIG. 15 illustrated alert 290 generated by run 602 of SAD pipeline 400 with data 205 performed on Jan. 1, 2021 being compared to the alert 290' generated by the run 602' of the SAD pipeline 400' with data 205' on Jan. 2, 2021. It can be appreciated that the comparison shown in FIG. 15 can be part of process 1100 and/or 1400. The illustrations in FIGS. 7-8, 10, 12-13 can be facilitated by Governance View Module 280, which permits users to check the input data, the tasks, transforms, models, pipeline, insights, alerts, score, etc.

FIG. 16 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other special-purpose computing system environments or configurations. Examples of well-known computing systems, environments, and/or configurations that may be suitable for use with the system shown in FIG. 16 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention.

The components of the computer system may include, but are not limited to, one or more processors or processing units 12, a memory 16, and a bus 14 that operably couples various system components, including memory 16 to processor 12.

In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by the computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor, functional units of a processor, or computer implemented system, and logic integrated with and/or executable by the system, processor, or functional units, the logic being configured to perform one or more of the process steps cited herein. What is meant by integrated with is that in an embodiment the functional unit or processor has logic embedded therewith as hardware logic, such as an application specific integrated circuit (ASIC), a field programmable gate array (FPGA), etc. By executable by the functional unit or processor, what is meant is that the logic in an embodiment is hardware logic; software logic such as firmware, part of an operating system, part of an application program; etc., or some combination of hardware or software logic that is accessible by the functional unit or processor and configured to cause the functional unit or processor to perform some functionality upon execution by the functional unit or processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above. If will be further appreciated that embodiments of the present invention may be provided in the form of a service deployed on behalf of a customer to offer a service on demand.

The terminology used herein is for the purpose of describing particular embodiments only and is not intended to be limiting of the invention. Unless otherwise specifically defined herein, all terms are to be given their broadest possible interpretation including meanings implied from the specification as well as meanings understood by those skilled in the art and/or as defined in dictionaries, treatises, etc. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment and terminology was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for capturing data and metadata for providing traceability of data analytic pipeline runs comprising:
   triggering a first pipeline run;
   obtaining a pipeline configuration for the first pipeline run, including one or more tasks;
   capturing and storing the pipeline configuration and starting inputs for the first pipeline run;
   executing the first pipeline run;
   capturing, before each task in the first pipeline run is executed, input data and input metadata for each task;
   capturing, after each task in the first pipeline run is executed, output data and output metadata for each task;
   generating a traceability view of the first pipeline run;
   showing all tasks in the first pipeline run and their sequence; and
   showing the input data, the input metadata, the output data, and the output metadata for each task of the first pipeline run.

2. The computer-implemented method according to claim 1, further comprising capturing pipeline metadata.

3. The computer-implemented method according to claim 1, wherein the first pipeline run is triggered manually or using a scheduler.

4. The computer-implemented method according to claim 1, wherein a pipeline manager invokes a pipeline configuration manager to obtain the first pipeline configuration.

5. The computer-implemented method according to claim 1, wherein a pipeline manager invokes a governance manager to capture and store the configuration for the first pipeline run and the starting inputs for the first pipeline run.

6. The computer-implemented method according to claim 5, further comprising the governance manager capturing and storing the input data, the input metadata, the output data, and the output metadata for each task in the first pipeline run.

7. The computer-implemented method according to claim 1, further comprising:
   selecting one data instance; and
   tracing the starting input for the one data instance through each task in the first pipeline run.

8. The computer-implemented method according to claim 1, further comprising:
   triggering a second pipeline run;
   obtaining a pipeline configuration for the second pipeline run, including one or more tasks;
   capturing and storing the pipeline configuration and starting inputs for the second pipeline run;
   executing the second pipeline run;
   capturing, before each task in the second pipeline run is executed, input data and input metadata for each task;
   capturing, after each task in the second pipeline run is executed, output data and output metadata for each task; and
   capturing one or more alerts for the second pipeline run.

9. The computer-implemented method according to claim 8, further comprising
   selecting any two pipeline runs for a given claim and request a comparison;
   retrieving the configuration of the two pipeline runs;
   comparing the configuration of the two pipeline runs;
   displaying the configuration differences between the two pipeline runs;
   comparing the input data, the input metadata, the output data and the output metadata for each task in the two pipeline runs; and
   displaying the differences in the input data, the input metadata, the output data, and the output metadata for each task in the two pipeline runs.

10. The computer-implemented method according to claim 9, further comprising:
    comparing the two pipeline runs against historical pipeline runs;
    checking whether the number of alerts in the two pipeline runs is greater than or less than the historical pipeline runs by a threshold.

11. The computer-implemented method according to claim 10, further comprising generating a report showing the differences between the two pipeline runs.

12. The computer-implemented method according to claim 9, further comprising:
  selecting any two dates and request a comparison between pipeline runs for the two dates;
  retrieving the configuration of the pipeline runs for the two dates;
  comparing the configuration of the pipeline runs for the two dates;
  displaying the configuration differences between the pipeline runs for the two dates;
  comparing the input data, the input metadata, the output data and the output metadata for each task in the pipeline runs for the two dates; and
  displaying the differences in the input data, the input metadata, the output data, and the output metadata for each task in the pipeline runs for the two dates.

13. A computer-implemented system to capture data for providing traceability for data analytic pipeline runs comprising:
  a memory storage device storing program instructions; and
  a hardware processor having circuitry and logic to execute said program instructions to provide traceability of data analytic pipeline runs, the hardware processor coupled to said memory storage device and in response to executing said program instructions, is configured to:
  trigger a first pipeline run;
  obtain a pipeline configuration for the first pipeline run, including one or more tasks;
  capture and storing the pipeline configuration and starting inputs for the first pipeline run;
  execute the first pipeline run;
  capture, before each task in the first pipeline run is executed, input data and input metadata for each task;
  capture, after each task in the first pipeline run is executed, output data and output metadata for each task; and
  capture one or more alerts for the first pipeline run, including the number of alerts in the first pipeline run;
  compare the first pipeline run against historical pipeline runs, including comparing a number of the one or more alerts in the first pipeline run to a number of alerts in the historical pipeline runs; and
  check whether the number of one or more alerts in the first pipeline run is greater or less than the number of alerts in historical pipeline runs by a threshold.

14. The computer-implemented system according to claim 13, wherein the hardware processor, in response to executing said program instructions, is further configured to capture pipeline metadata.

15. The computer-implemented system according to claim 13, wherein the hardware processor, in response to executing said program instructions, is configured to:
  invoke a pipeline manager to execute the first pipeline run; and
  invoke a pipeline configuration manager to obtain the first pipeline configuration.

16. The computer-implemented system according to claim 13, wherein the hardware processor, in response to executing said program instructions, is further configured to:
  capture and store, by a governance manager, the configuration for the first pipeline run, the starting inputs for the first pipeline run; and the input data, the input metadata, the output data, and the output metadata for each task in the first pipeline run.

17. The computer-implemented system according to claim 13, wherein the hardware processor, in response to executing said program instructions, is further configured to:
  choose a pipeline run to generate a traceability view;
  generate a traceability view of the pipeline run;
  show all tasks in the pipeline run and their sequence;
  show the input data, the input metadata, the output data, and the output metadata for each task of the pipeline run;
  select one data instance; and
  trace the starting input for the one data instance through each task in the pipeline run.

18. The computer-implemented system according to claim 13, wherein the hardware processor, in response to executing said program instructions, is further configured to:
  trigger a second pipeline run;
  obtain a pipeline configuration for the second pipeline run, including one or more tasks;
  capture and storing the pipeline configuration and starting inputs for the second pipeline run;
  execute the second pipeline run;
  capture, before each task in the second pipeline run is executed, input data and input metadata for each task;
  capture, after each task in the second pipeline run is executed, output data and output metadata for each task;
  capture one or more alerts for the second pipeline run;
  retrieve the configuration of the first and second pipeline runs;
  compare the configuration of the first and second pipeline runs;
  displaying the configuration differences between the first and second pipeline runs;
  comparing the input data, the input metadata, the output data and the output metadata for each task in the first and second pipeline runs; and
  displaying the differences in the input data, the input metadata, the output data, and the output metadata for each task in the first and second pipeline runs.

19. A non-transitory computer readable medium comprising instructions that, when executed by at least one hardware processor, configure the at least one hardware processor to:
  trigger a first pipeline run;
  obtain a pipeline configuration for the first pipeline run, including one or more tasks;
  capture and storing the pipeline configuration and starting inputs for the first pipeline run;
  execute the first pipeline run;
  capture, before each task in the first pipeline run is executed, input data and input metadata for each task;
  capture, after each task in the first pipeline run is executed, output data and output metadata for each task;
  capture one or more alerts for the first pipeline run, where an alert identifies a person or incident that meets or is at least one of a condition group consisting of: abnormal, indicative of a problem, requires further review, and combinations thereof;
  trigger a second pipeline run;
  obtain a pipeline configuration for the second pipeline run, including one or more tasks;
  capture and storing the pipeline configuration and starting inputs for the second pipeline run;
  execute the second pipeline run;
  capture, before each task in the second pipeline run is executed, input data and input metadata for each task;

capture, after each task in the second pipeline run is executed, output data and output metadata for each task; and capture one or more alerts for the second pipeline run.

\* \* \* \* \*